(12) United States Patent
Brown et al.

(10) Patent No.: US 10,410,229 B2
(45) Date of Patent: Sep. 10, 2019

(54) MEDIA CONSUMER VIEWING AND LISTENING BEHAVIOR

(71) Applicant: International Business Machines Corporation, Armonk, NY (US)

(72) Inventors: Michael S. Brown, Sydney (AU); Stefan Harrer, Hampton (AU); Laurence J. Plant, North Balwyn (AU)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 14/573,302

(22) Filed: Dec. 17, 2014

(65) Prior Publication Data

US 2016/0180362 A1 Jun. 23, 2016

(51) Int. Cl.
*G06Q 30/02* (2012.01)
*H04N 21/258* (2011.01)
*H04N 21/442* (2011.01)
*H04N 21/414* (2011.01)
*H04N 21/658* (2011.01)

(52) U.S. Cl.
CPC ..... *G06Q 30/0204* (2013.01); *G06Q 30/0201* (2013.01); *H04N 21/25883* (2013.01); *H04N 21/25891* (2013.01); *H04N 21/41407* (2013.01); *H04N 21/44204* (2013.01); *H04N 21/6582* (2013.01)

(58) Field of Classification Search
CPC .................................................... G06Q 30/02
USPC ....................................................... 705/7.33
See application file for complete search history.

(56) References Cited

U.S. PATENT DOCUMENTS

| 8,515,805 | B1 | 8/2013 | Rennison | |
|---|---|---|---|---|
| 8,650,586 | B2 | 2/2014 | Lee et al. | |
| 2007/0016918 | A1* | 1/2007 | Alcorn | G06F 17/30743 725/22 |
| 2009/0123025 | A1* | 5/2009 | Deng | G06K 9/00711 382/100 |
| 2011/0289524 | A1 | 11/2011 | Toner et al. | |
| 2014/0150001 | A1* | 5/2014 | McMillan | H04N 21/44213 725/9 |

(Continued)

OTHER PUBLICATIONS

Mandese, Joe; "Nielsen Unveiling Suite of Next-Generation TV Meters: Designed to Enhance Compliance, Cross-Platform Measurement Too"; MediaDailyNews; May 11, 2012; Printed Sep. 22, 2014; <http://www.mediapost.com/publications/article/174443/nielsn-unveil-suite-of-next-generation-tv-mete.html>.

(Continued)

*Primary Examiner* — Nga B Nguyen
(74) *Attorney, Agent, or Firm* — Edward J. Wixted, III

(57) ABSTRACT

In an approach for monitoring media consumption, a processor receives data from a media collection device, wherein the data comprises at least information generated by at least one media broadcasting device of one or more media broadcasts. A processor compares the data to previously stored signatures, wherein the previously stored signatures are each associated with a respective media broadcast. A processor identifies the one or more media broadcasts using the data and the previously stored signatures. A processor compiles the identified one or more media broadcasts with a set of previously stored media broadcasts associated with the media collection device.

16 Claims, 4 Drawing Sheets

(56) References Cited

U.S. PATENT DOCUMENTS

| | | | |
|---|---|---|---|
| 2014/0280874 A1* | 9/2014 | Bosworth | G06F 21/6245 |
| | | | 709/224 |
| 2014/0282659 A1* | 9/2014 | Arling | H04N 21/44222 |
| | | | 725/14 |
| 2015/0106531 A1* | 4/2015 | Nanjegowda | H04L 65/4076 |
| | | | 709/231 |
| 2016/0078459 A1* | 3/2016 | Borland | G06Q 30/0204 |
| | | | 705/7.33 |
| 2016/0094601 A1* | 3/2016 | Besehanic | H04L 67/32 |
| | | | 709/219 |
| 2016/0119672 A1* | 4/2016 | Alonso | H04N 21/44008 |
| | | | 725/19 |

OTHER PUBLICATIONS

Zornow, Dave; "Nielsen's Active/Passive Digital Meter"; Dave Zornow Articles; Printed Nov. 11, 2014; <http://www.tngresearch.com/old_articles/active_passive.htm>.

"Audience measurement" Wikipedia, the free encyclopedia; Printed Sep. 22, 2014; <http://en.wikipedia.org/wiki/Audience_measurement>.

"Dongle for TV Location Identification and Advertisement Insertion"; An IP.com Prior Art Database Technical Disclosure; IP.com No. IPCOM00023792D; Electronic Publication: May 15, 2014.

* cited by examiner

MEDIA CONSUMER VIEWING AND LISTENING BEHAVIOR

BACKGROUND OF THE INVENTION

The present invention relates generally to the field of media consumption and monitoring, and more particularly to capturing and analyzing media consumption data of a user or a set of users.

Media consumption is the sum of information and entertainment media taken in by an individual or group. Media consumption includes activities such as watching television and film, listening to audio, and consuming other forms of media.

Audience measurement measures how many people are in an audience, usually in relation to radio listenership and television viewership. Broadcasters and advertisers are oftentimes interested in how many people are watching or listening, as well as who (e.g., what demographic) is watching or listening.

SUMMARY

Aspects of an embodiment of the present invention disclose a method, computer program product, and computer system for monitoring media consumption. A processor receives data from a media collection device, wherein the data comprises at least information generated by at least one media broadcasting device of one or more media broadcasts. A processor compares the data to previously stored signatures, wherein the previously stored signatures are each associated with a respective media broadcast. A processor identifies the one or more media broadcasts using the data and the previously stored signatures. A processor compiles the identified one or more media broadcasts with a set of previously stored media broadcasts associated with the media collection device.

DETAILED DESCRIPTION

Embodiments of the present invention recognize that advertisers, broadcasters, market researchers, and other enterprises are interested in media consumption behavior of individuals. Embodiments of the present invention recognize that sampling techniques may not provide accurate statistics, as such techniques fail to account for factors such as individual viewer or listener location, individual viewer or listener actions (e.g., replaying an advertisement, channel surfing), media device status (e.g., muted television), mode of media consumption (e.g., live broadcast, time-shifted recording, streaming), or other factors. Embodiments of the present invention provide for an approach to collect viewing data and an approach to analyze collected viewing data to more accurately identify viewer trends and behaviors. In addition, embodiments of the present invention provide for an approach to predict demographic information associated with a viewer based on viewing habits and/or trends.

The present invention will now be described in detail with reference to the Figures.

Figure 1:
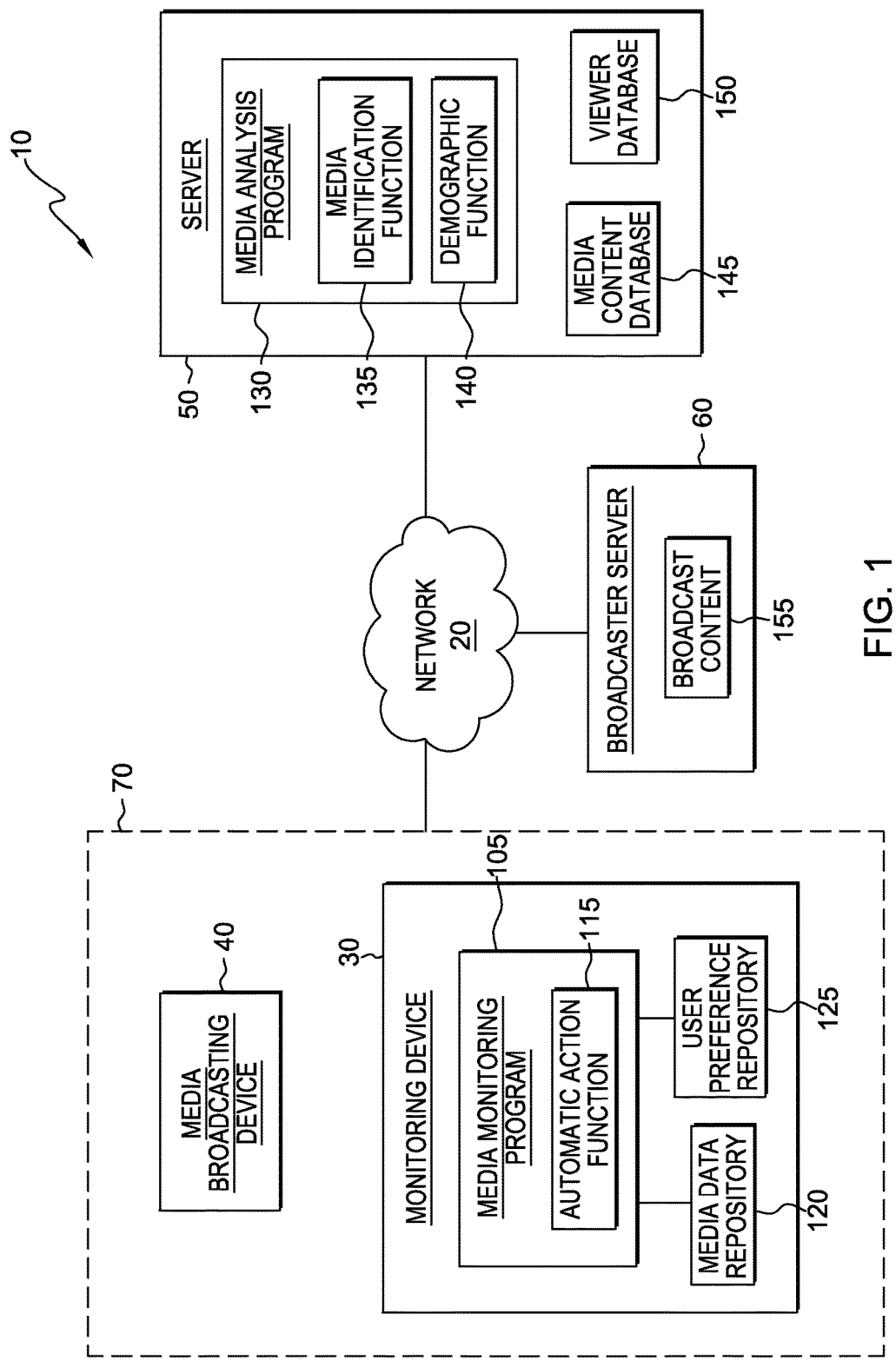
FIG. 1 depicts a diagram of a computing environment, in accordance with one embodiment of the present invention.

FIG. 1 depicts a diagram of computing environment 10, in accordance with one embodiment of the present invention. FIG. 1 provides only an illustration of one embodiment and does not imply any limitations with regard to the environments in which different embodiments may be implemented.

In the depicted embodiment, computing environment 10 includes monitoring device 30, server 50, and broadcaster server 60 interconnected over network 20. Computing environment 10 also includes media broadcasting device 40. In the depicted embodiment, media broadcasting device 40 is not connected to network 20. In other embodiments (not shown), media broadcasting device may be connected to network 20. Network 20 may be a local area network (LAN), a wide area network (WAN) such as the Internet, the public switched telephone network (PSTN), any combination thereof, or any combination of connections and protocols that will support communications between monitoring device 30, server 50, and broadcaster server 60, in accordance with embodiments of the invention. Network 20 may include wired, wireless, or fiber optic connection. Computing environment 10 may include additional computing devices, servers, computers, or other devices not shown.

In the depicted embodiment, monitoring device 30 and media broadcasting device 40 are each located within geographic region 70. In general, geographic region 70 is a geographic region within which monitoring device 30 can collect viewing data from, and/or perform actions upon, media broadcasting device 40. Geographic region 70 may be, for example, a room of a household or other dwelling, an interior of a car, or any other location where a user of monitoring device 30 may be exposed to media from media broadcasting device 40.

Monitoring Device 30 may be a tablet computer, personal digital assistant, smartphone, or set-top box. In general, monitoring device 30 may be any electronic device or computing device capable of processing program instructions, sending and receiving data, and communicating with server 50 over network 20. Monitoring device 30 may include, for example, a microphone, camera, infrared (IR) reader, or any other sensor or device capable receiving information related to media broadcast from media broadcasting device 40. In some embodiments, monitoring device 30 further includes an IR blaster. In some embodiments, monitoring device 30 further includes a sensor capable of the input of, for example, a wireless video gaming controller. In some embodiments, monitoring device 30 includes a location identification means, such as, for example, a compass, global positioning system (GPS) receiver, or utilizes triangulation, trilateration, or other techniques to identify the location of monitoring device 30. In some embodiments monitoring device 30 is affixed to, or otherwise located at or near, broadcasting device 40. In other embodiments, monitoring device 30 is a component of media broadcasting device 40. In still other embodiments, monitoring device 30 is a mobile device. In some embodiments, monitoring device 30 may comprise multiple devices that collectively perform functions associated with monitoring device 30. For example, a set-top box and smartphone may each operate to collect viewing data, such as, when the smartphone is geographically located near the set-top box. Alternatively, in such an example, the set-top box may collect data for the user associated with the smartphone in response to the smartphone being geographically located near the set-top box. Such a setup may help to preserve battery-life of a mobile version of monitoring device 30. Monitoring device 30 contains media monitoring program 105, automatic action function 115, media data repository 120, and user preference repository 125. Monitoring device 30 may include components, as depicted and described in further detail with respect to FIG. 6.

Media monitoring program 105 operates to collect and monitor viewing data via one or more sensors or input devices of monitoring device 30. Media monitoring program 105 sends collected viewing data to media analysis program 130 via network 20 for analysis. In some embodiments, such as when media monitoring program 105 does not have access to media analysis program 130 via network 20, media monitoring program 105 stores collected viewing data locally to media data repository. Media monitoring program 105 includes automatic action function 115. In some embodiments, media monitoring program resides on monitoring device 30. In other embodiments, media monitoring program 105 may reside on another server, or another computing device, provided that media monitoring program 105 has access to location identifying information associated with monitoring device 30.

Automatic action function 115 operates to perform an action to media broadcasting device 40 based on user preferences or previously analyzed viewer behavior and/or pattern information. Such an action may include, but is not limited to, adjusting volume (e.g., muting), changing channel/station, powering on or off, fast-forwarding, rewinding, recording, or otherwise interacting with media broadcasting device 40. In some embodiments, monitoring device 30 includes an IR blaster, allowing automatic action function 115 to interaction with media broadcasting device 40 when media broadcasting device 40 is, for example, a television or stereo. In other embodiments, monitoring device 30 and media broadcasting device 40 are each connected to network 20, and automatic action function 115 is able to interact with media broadcasting device 40 via network 20. In some embodiments, automatic action function 115 is a function of media monitoring program 105. In other embodiments, automatic action function 115 is a stand-alone program. In some embodiments, automatic action function 115 resides on monitoring device 30. In other embodiments, automatic action function 115 may reside on another server, or another computing device, provided automatic action function 115 has access to location identifying information associated with monitoring device 30.

Media data repository 120 may be a repository that may be written and read by media monitoring program 105. Viewing data gathered by media monitoring program 105 may be stored to media data repository 120. In some embodiments, viewing data gathered by media monitoring program 105 is temporarily stored by media monitoring program 105, such as when media monitoring program 105 is not connected to a network, such as network 20. For example, monitoring device 30 may be a mobile device that connects to network 20 via an Ethernet or wireless LAN connection. A user may, for example, bring monitoring device 30 with the user while the user listens to radio in a car. In such a situation, media monitoring program 105 may temporarily store viewing data to media repository 120. Upon connecting to network 20, media monitoring program 105 may forward the stored viewing data to media analysis program 130 via network 20. In one embodiment, media data repository 120 resides on monitoring device 30.

User preference repository 125 may be a repository that may be written and/or read by media monitoring program 105 and automatic action function 115. User preference information, such as, for example, actions to perform when specified conditions are met, may be stored to user preference repository 125. In some embodiments, user preference information further includes privacy settings. Privacy settings may include, for example, what type of data to collect and/or share (e.g., audio, video, location information), time periods during which collection of viewing data is acceptable, if data is to be shared anonymously (i.e., not associated with a particular monitoring device 30), or other settings relevant to protecting the desired privacy of a user of monitoring device 30. Privacy settings may be set by individual users of monitoring device 30, in order to limit or allow viewing data collection and transfer based on the preferences of the user. In one embodiment, user preference repository 125 resides on monitoring device 30. In other embodiments, user preference repository may reside on another server or another computing device, provided that user preference repository 125 is accessible to automatic action function 115.

Media broadcasting device 40 may be a laptop computer, tablet computer, netbook computer, PC, a desktop computer, television, radio, stereo, home theatre system, video game console, digital video recorder (DVR), or any electronic device capable of generating audio, visual, or audiovisual media content. In some embodiments, media broadcasting device 40 is connected to monitoring device 30 and/or server 50 via network 20. In other embodiments, monitoring device 30 is connected to media broadcasting device 40 via electronic cabling, such as when, for example, monitoring device 30 is a set-top box for media broadcasting device 40. In one embodiment, media broadcasting device 40 relays live broadcast signal to a user. In another embodiment, media broadcasting device 40 is capable of storing media for later viewing by a user. Media broadcasting device 40 may include components, as depicted and described in further detail with respect to FIG. 6.

Server 50 may be a management server, a web server, or any other electronic device or computing system capable of processing program instructions, and receiving and sending data. In some embodiments, server 50 may be a laptop computer, tablet computer, netbook computer, PC, a desktop computer, or any programmable electronic device capable of communicating with monitoring device 30 and broadcaster server 60 via network 20. In other embodiments, server 50 may represent a server computing system utilizing multiple computers as a server system, such as in a cloud computing environment. In another embodiment, server 50 represents a computing system utilizing clustered computers and components to act as a single pool of seamless resources. Server 50 contains media analysis program 130, media identification function 135, demographic function 140, media content database 145, and viewer database 150. Server 50 may include components, as depicted and described in further detail with respect to FIG. 6.

Media analysis program 130 operates to analyze viewing data received from media monitoring program 105. Media analysis program 130 includes media identification function 135 and demographic function 140. In some embodiments, media analysis program 130 analyzes broadcast content and generates audio signatures, screen captures, or other information for use by media identification function 135 to identify a program or advertisement associated with received viewing data. In some embodiments, media analysis program 130 operates according to a set of previously stored privacy settings, such as the privacy settings stored to user preference repository 125. In the depicted embodiment, media analysis program 130 resides on server 50. In other embodiments, media analysis program 130 may reside on another server or another computing device, provided that media analysis program 130 is accessible to media monitoring program 105, and provided that media analysis program 130 has access to media content database 145, viewer database 150, and broadcast content 155.

Media identification function 135 operates to compare received viewing data to previously stored broadcast data to identify particular programs, advertisements, or other types of media content associated with the received viewing data. In some embodiments, media identification function is further able to determine when portions of a broadcast were skipped, or otherwise ignored. For example, received viewing data may indicate that, during a live broadcast, media broadcasting device 40 was muted at the time a particular advertisement was played during the live broadcast. In another example, received viewing data may indicate that an advertisement or portion of a program was fast forwarded through during a viewing of a previously recorded broadcast. In yet another example, received viewing data may indicate that a user of monitoring device 30 exited geographic region 70, or exhibited particular movement patterns, indicating a level of engagement of the user with regard to the media content of media broadcasting device 40. In yet another example, received viewing data may indicate video game controller actions wirelessly sent to a video game console or PC. In some embodiments, media identification function 135 stores results and associates the results with a particular viewer or household. In some embodiments, media identification function 135 compiles results and generates a report or other information accessible to, for example, a broadcaster, cable provider, satellite provider, advertiser, or other enterprise. In some embodiments, media identification function 135 is a function of media analysis program 130. In other embodiments, media identification function 135 is a stand-alone program. In some embodiments, media identification function resides on server 50. In other embodiments, media identification function 135 may reside on another server or another computing device, provided that media identification function 135 is accessible to media monitoring program 105 and media analysis program 130, and provided that media identification function 135 has access to media content database, broadcast content 155, and viewer database 150.

Demographic function 140 operates to analyze viewer behaviors and trends associated with a user and predict demographic information of the viewer, based on media consumption trends of the user and demographic information previously associated with media consumption trends. Media consumption trends may include, for example, time (e.g., time of day, day of week, amount of time, etc.) media consumption occurs, programs consumed, program types (e.g., news, sports) consumed, media format (e.g., cable television, over-the-air programming, radio, internet video, video game, video game platform), or other trends. In some embodiments, demographic function 140 is a function of media analysis program 130. In other embodiments, demographic function 140 is a stand-alone program. In some embodiments, demographic function 140 resides on server 50. In other embodiments, demographic function 140 may reside on another server or another computing device, provided that demographic function 140 is accessible to media analysis program 135, and provided that demographic function 140 has access to viewer database 150.

Media content database 145 may be a repository that may be written and/or read by media analysis program 130 and media identification function 135. Media content information, such as audio signatures, screen captures, time stamps, or other information relevant to identifying a program or advertisement using received viewing data may be stored to media content data 145. In one embodiment, media content database 145 resides on server 50. In other embodiments, media content database 145 may reside on another server or another computing device, provided that media content database 145 is accessible to media analysis program 130 and media identification function 135.

Viewer database 150 may be a repository that may be written and/or read by media analysis program 130, media identification function 135, and demographic function 140. Viewing data and corresponding broadcasts or viewing trends associated with viewing data, such as information generated by media identification function 135, may be stored to viewer database 150. In some embodiments, predicted demographic information of a viewer may be stored to viewer database 150.

Broadcaster server 60 may be the origin of media broadcast, or otherwise provided to media broadcasting device 40, and can be analog/digital television or radio signal transmission equipment, or an internet-based streaming media or download server. Broadcaster server 60 may be a management server, a web server, or any other electronic device or computing system capable of processing program instructions, and receiving and sending data. In some embodiments, broadcaster server 60 may be a laptop computer, tablet computer, netbook computer, PC, a desktop computer, or any programmable electronic device capable of communicating with server 50 via network 20. Broadcaster server 60 contains broadcast content 155. Broadcaster server 60 may include components, as depicted and described in further detail with respect to FIG. 6.

Broadcast content 155 is content related to media programming and/or advertisements. Broadcast content 155 may include, for example, television media guides, advertisements/advertisers, broadcast signals, or any other information related to media programming and/or advertisements. In some embodiments, broadcast content 155 includes timestamps, or other date and time information, associated with media programming and/or advertisements. Broadcast content 155 may be associated with, for example, but not limited to, a radio station, television network, cable provider, satellite provider, game developer, or other media-related outlet. In general, broadcast content 155 includes any information that media analysis program 130 may utilize related to viewing data associated with monitoring device 30.

While the description herein references viewing data, embodiments of the present invention recognize that audio, print, and other types of media data may be collected. As used herein, viewer may include listeners, readers, gamers, or other types of individuals capable of consuming various forms of media.

Figure 2:
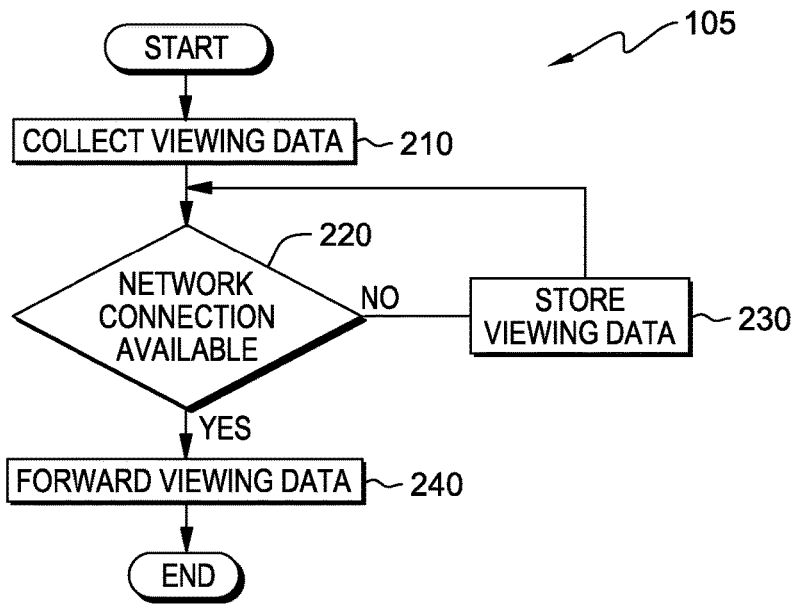
FIG. 2 depicts a flowchart of the steps of a media monitoring program executing within the computing environment of FIG. 1, for monitoring viewing data, in accordance with one embodiment of the present invention.

FIG. 2 depicts a flowchart of the steps of a media monitoring program, executing within the computing environment of FIG. 1. Media monitoring program 105 operates to collect viewing data, in accordance with an embodiment of the present invention.

In step 210, media monitoring program 105 collects viewing data. Viewing data, may include, but is not limited to, audio, video, IR signals (e.g., commands issued to media broadcasting device 40 via a remote control), photos, location information (e.g., GPS coordinates, location data via trilateration or triangulation techniques, etc.), user information, account profile information, or other information related to the consumption of various forms of media. In some embodiments, media monitoring program 105 collects viewing data according to previously selected privacy settings stored to user preference repository 125. Based on the privacy settings, media monitoring program 105 may be restricted as to the type of information to be collected, the time periods during which media monitoring program 105 collects viewing data, or restricted via other privacy settings. As described in reference to FIG. 1, media monitoring program 105 may reside on monitoring device 30. Monitoring device 30 may include sensors and/or other types of input capabilities. For example, monitoring device 30 may include a microphone, camera, IR sensor, GPS receiver, or any other sensor or input capability that may allow media monitoring program 105 to collect viewing data. In some embodiments, media monitoring program 105 continuously collects viewing data. For example, media monitoring program 105 may cause a microphone of monitoring device 30 to remain continuously active, such that audio from media broadcasting device 40, or any other media broadcasting device, can be collected. In some embodiments, media monitoring program 105 will cause monitoring device 30 to deactivate applicable sensors or input capabilities of monitoring device 30 to, for example, conserve power consumption or battery-life of monitoring device 30. In some embodiments, media monitoring program 105 may cause monitoring device 30 to periodically reactivate sensors or input capabilities of monitoring device 30, to collect potential viewing data. For example, media monitoring program 105, or a function of media monitoring program 105 (not shown) may recognize a lack of viewing data, such as when a user carrying monitoring device 30 is asleep, or outside, and in response, media monitoring program 105 may cause monitoring device 30 to deactivate certain sensors or input capabilities, or may cause monitoring device 30 to periodically reactivate certain sensors or input capabilities, until media monitoring program 105 identifies that viewing data is being collected. In some embodiments, media monitoring program 105, upon identifying that viewing data is being collected, may cause monitoring device 30 to continuously collect viewing data via sensors or input capabilities of monitoring device 30. In some embodiments, viewing data collection preferences are preselected, or can be stored by a user of monitoring device 30 to user preference repository 125, for use by media monitoring program 105.

In decision 220, media monitoring program 105 determines whether a network connection, such as a connection to network 20, is available. In some embodiments, monitoring device 30 may require an Ethernet or wireless LAN connection to network 20. In other embodiments, monitoring device 30 may have capabilities to connect to network 20 via a cellular network, such as when, for example, monitoring device 30 is a smartphone, tablet, or netbook. If media monitoring program 105 determines that a connection to network 20 is not available (decision 220, no branch), some embodiments of media monitoring program may store collected viewing data, or certain portions of collected viewing data, to media data repository 120 (step 230).

In step 230, media monitoring program 105 stores collected viewing data, or certain portions of collected viewing data, to media data repository 120. Generally, media monitoring program 105 may store collected viewing data temporarily, until a connection to network 20 is available. A user carrying monitoring device 30 may be in an area without cellular service or otherwise without a connection to network 20, yet be consuming media and media monitoring program 105 may be collecting viewing data. For example, a user carrying monitoring device 30 may be listening to a radio in the car, or watching television in a remote area. In some embodiments, media monitoring program 105 may selectively store viewing data, in order to effectively utilize available storage capacity associated with media data repository 120. In other embodiments, media monitoring program 105 stores all collected viewing data to media data repository 120. In still other embodiments, media monitoring program 105 initially stores all collected viewing data to media data repository 120, and selectively removes or compresses collected viewing data, as additional viewing data is collected and stored. Upon storing viewing data, media monitoring program 105 monitors whether a network connection is available (see decision 220).

If media monitoring program 105 determines a connection to network 20 is available (decision 220, yes branch), media monitoring program 105 forwards collected viewing data to media analysis program 130 (step 240), on server 50, for analysis by media identification function 135 and/or demographic function 140. In some embodiments, media monitoring program 105 causes collected viewing data to be stored to viewer database 150. In some embodiments, media monitoring program 105 may forward information according to privacy settings, such as privacy settings stored to user preference repository 125. For example, privacy settings stored to user preference repository 125 may specify that collected viewing data may be forwarded to media analysis program 130, but the viewing data may only be used by media analysis program 130 for one or more specified purposes (e.g., to collect television ratings, to identify viewed advertisements). In another example, privacy settings stored to user preference repository 125 may specify that collected viewing data may be forwarded to media analysis program 130, but the viewing data shall remain anonymous and not associated with a known monitoring device 30. In one embodiment, anonymous viewing data is linked to a particular monitoring device 30, but the particular monitoring device 30 is not known, allowing for a compilation of collected viewing data to be analyzed for a particular monitoring device 30. In another embodiment, media monitoring program 105 generally forwards anonymous viewing data to media analysis program 130, but the viewing data is not associated with a particular monitoring device 30. In such an embodiment, the viewing data may be used an analyzed, but the use of the viewing data may be more limited because the viewing data is not linked to a particular monitoring device 30.

As discussed above, media monitoring program 105 may continue to collect viewing data, as per user preferences, privacy settings, and/or other preselected settings or criteria.

Figure 3:
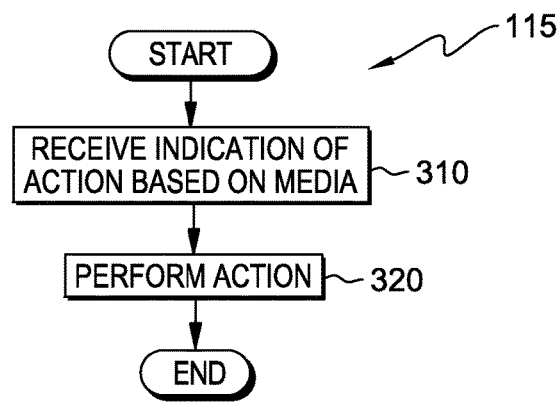
FIG. 3 depicts a flowchart of the steps of an automatic action function of a media monitoring program executing within the computing environment of FIG. 1, for performing an action based on preselected user preferences, in accordance with one embodiment of the present invention.

FIG. 3 depicts a flowchart of the steps of an automatic action function, a function of media monitoring program 105, executing within the computing environment of FIG. 1. Automatic action function 115 operates to cause an action to be performed to media broadcasting device 40, in accordance with an embodiment of the present invention.

In one embodiment, initially, user preference information related to one or more actions are stored to user preference repository 125. In another embodiment, a function (not shown) of media analysis program 130 utilizes trend and/or pattern information associated with a user of monitoring device 30, and predicts one or more actions to associate with the user. Actions refer generally to any interaction with media broadcasting device 40, and may vary based on the device type of media broadcasting device 40. For example, media broadcasting device 40 may be a television, and the action may be to mute advertisements during a live television broadcast. Other examples may include to fast-forward through advertisements, mute certain types of advertisements. Additional actions may include, but are not limited to, turning off media broadcasting device 40 when location information indicates that the user of monitoring device 30 is no longer at the same location as broadcasting device 40, or changing a channel or station at a specific time based on a frequently viewed program or radio show.

In step 310, automatic action function 115 receives an indication of an action to cause media broadcasting device 40 to perform, based on, for example, the current media of media broadcasting device 40. In some embodiments, as discussed above, an indication of an action may be retrieved, or otherwise received, from user preference repository 125, responsive to previously stored user preferences. In some embodiments, media analysis program 130 may identify patterns or other trends associated with a user of monitoring device 30 and predict actions desired by the user of monitoring device 30. In some embodiments, media analysis program 130 may query a user of monitoring device 30 about the desire of such an action prior to causing automatic action function 310 to receive the indication of the action.

In step 320, automatic action function 115 performs the action. In some embodiments, monitoring device 30 includes an IR blaster, and automatic action function 115 causes the IR blaster of monitoring device 30 to perform the action, similar to how a user might perform an action to a media broadcasting device, such as media broadcasting device 40, using a remote control. In other embodiments, media broadcasting device 40 may be connected to network 20, and automatic action function 115 may have capabilities to perform actions via instructions over network 20. In still other embodiments, monitoring device 30 is, for example, a set-top box or other device attached to, or otherwise integrated with, media broadcasting device 40. In such an embodiment, monitoring device 30 may have capabilities to perform actions with regard to media broadcasting device 40 due to the attachment or integration with media broadcasting device 40.

Figure 4:
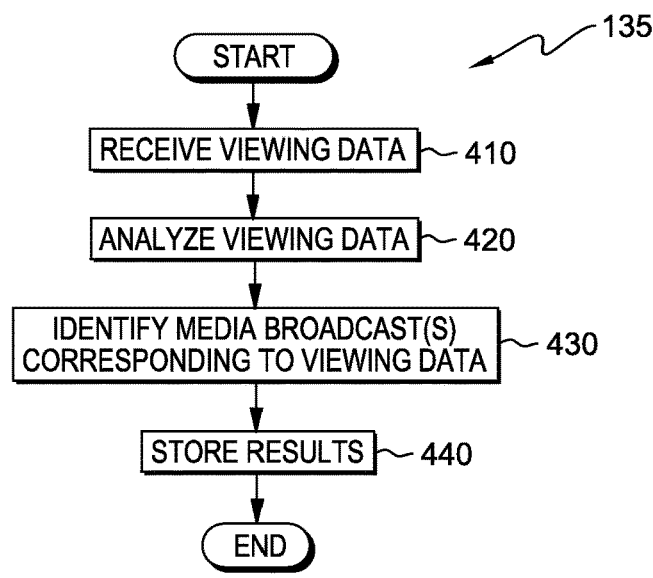
FIG. 4 depicts a flowchart of the steps of a media identification function of a media analysis program executing within the computing environment of FIG. 1, for analyzing viewing data and identifying media broadcasts corresponding to viewing data, in accordance with one embodiment of the present invention.

FIG. 4 depicts a flowchart of the steps of a media identification function, a function of media analysis program 130, executing within the computing environment of FIG. 1. Media identification function 135 operates to analyze viewing data and identify associated media broadcasts and/or advertisements, in accordance with an embodiment of the present invention.

In one embodiment, initially, media analysis program 130 retrieves broadcast content information, such as broadcast content 155, from one or more broadcaster servers, such as broadcaster server 60. As described above, broadcast content 155 may be any type of information relevant to media broadcasting and media advertising. For example, broadcast content 155 may be live broadcasts, audio clips, video clips, program guides, or other forms of content or information. Media analysis program 130 may utilize broadcast content 155 to create audio or video signatures of programs or advertisements. Media analysis program 130 may associate timestamps, channels, and/or locations (e.g., television markets, radio broadcast locations, etc.) to particular programs, advertisements, or other forms of audio or visual media. This may allow media analysis program 130 to create a record of media broadcasts and advertisements over periods of time, at particular locations, and on particular channels. In general, media analysis program 130 may build broadcast content within media content database 145. In other embodiments, media analysis program 130 may query broadcaster server 60 for broadcast content 155, as appropriate, based on received viewing data.

Further, media analysis program 130 may, in some embodiments, receive viewing data passed from automatic action function 115 on monitoring device 30 and store the viewing data to viewer database 150. As discussed above, in some embodiments, received viewing data may be based on privacy settings associated with monitoring device 30, such as privacy settings stored to user preference repository 125. In some embodiments, media analysis program 130 associates viewing data received from monitoring device 30 and stored to viewing database 150 with monitoring device 30, and associates other viewing data received from other viewing devices and stored to viewing database 150 with other monitoring devices, respectively.

In step 410, media identification function 135 receives viewing data. In some embodiments, media identification function 135 receives viewing data passed from automatic action function 115 on monitoring device 30. In other embodiments, media identification function 135 receives viewing data from viewer database 150. As described above, viewing data may include information about a media program, advertisement, broadcast, or other media form. For example, viewing data may include audio clips, video clips, location information, received IR information, or other information. Types of viewing data received may be limited to sensors and other input capabilities of monitoring device 30.

In step 420, media identification function 135 analyzes the received viewing data. In some embodiments, media identification function 135 compares the received viewing data to information contained within broadcast content 155 of broadcaster server 60. Media identification function 135 may, for example, query for information from broadcast content 155 corresponding to aspects of the received viewing data. In other embodiments, media analysis program 130 has previously analyzed and/or stored broadcast content 155, and modified the form of broadcast content 155 to, for example, associate video or audio signatures with channels, timestamps, locations, etc. Media identification function 135 may, for example, identify portions of viewing data corresponding to previously created audio or video signatures associated with an advertisement or other media broadcast. Media identification function 135 may interpret IR signals of the viewing data and associate the IR signals with actions taken with respect to media broadcasting device 40 such as muting, changing a channel/station of, or powering on or off.

Media identification function 135 may interpret video game controller inputs of the viewing data, transmitted wirelessly to a video game console or PC, as indicating an action a user is performing, or combined with previously interpreted information, how the user's experience is with a particular game. For example, if the received inputs indicate that the user is hitting a single button multiple times, this may indicate that the user is, for example, frustrated with a loading screen, or trying to bypass an advertisement within a game. In some embodiments, media identification function 135 may compare time signatures associated with the viewing data to programming guides (e.g., programming guides stored to media content database 145 and/or that comprise broadcast content 155). Comparing viewing data time signatures or timestamps to programming guides may allow media identification function 135 to narrow data from which to identify comparisons, such as by predicting an expected television show or radio broadcast at the identified time.

In step 430, media identification function 135 identifies one or more media broadcasts (e.g., television broadcasts, radio broadcasts, advertisements, video games, movies, etc.) corresponding to the analyzed viewing data. In general, media identification function 135 may identify at least a portion of the viewing data that corresponds to broadcast content 155, or information stored to media content database 145 (e.g., audio signatures, video signatures, timestamps). For example, upon analyzing a portion of the viewing data, media identification function 135 may identify that the portion of the viewing data corresponds to an audio signature associated with a television program airing during a timestamp associated with the portion off the viewing data.

In step 440, media identification function 135 stores identified results to a database, such as viewer database 150. Identified results may include viewing data, analyzed viewing data, identified media broadcasts, and/or other information. In some embodiments, identified results are associated with a particular monitoring device, such as monitoring device 30, or a group of two or more monitoring devices. Identified results stored to viewer database 150 may be accessible to, for example, demographic function 140, as discussed below.

In some embodiments, media identification function 135 generates and stores a report. The report may indicate the results, as discussed above, and may further combine results associated with multiple users. In some embodiments, media identification function 135 combines the results associated with monitoring device 30 and other monitoring devices (not shown) that are collected within geographic region 70. In some embodiments, media identification function 135 combines the results associated with monitoring device 30 and other monitoring devices (not shown) that are most frequently located within geographic 70, such as to identify the members of a household and viewing habits of the household. The report generated by media identification function 135 may contain information stored to viewer database 150 (see step 440), and may further contain trends based on household, location, or media content. For example, the report may indicate trends with particular advertisements or broadcasts that show whether particular ads are frequently muted, television shows are watched, or other information. In some embodiments, the report may indicate location information associated with a user during a particular advertisement or media broadcast. For example, during a live sports broadcast, location information may be used to indicate engagement of a viewer, such as when it is known that a big play happened at a particular time during the live sports broadcast. A user that is interested in the live sports broadcast may react differently (e.g., jump up and down, take a lap around the couch) to the big play than a user who is not interested (e.g., remain still), and this reaction may present itself in the location information associated with the timestamp of the time of the big play.

Figure 5:
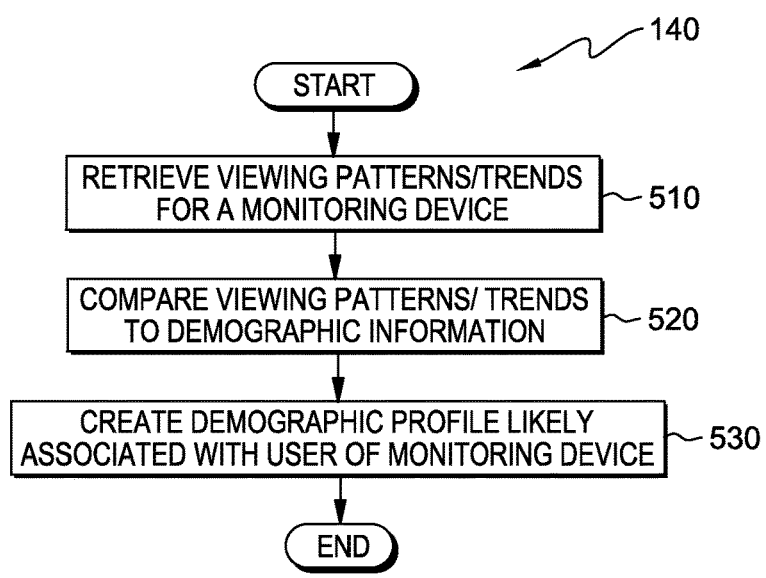
FIG. 5 depicts a flowchart of the steps of a demographic function of a media analysis program executing within the computing environment of FIG. 1, for creating a demographic profile of a user, based on demographic statistics associated with viewing data associated with the user, in accordance with one embodiment of the present invention.

FIG. 5 depicts a flowchart of the steps of a demographic function, a function of media analysis program 130, executing within the computing environment of FIG. 1. Demographic function 140 operates to analyze stored results (see media identification function 135) and create a profile of demographic information likely associated with a user of monitoring device 30, in accordance with an embodiment of the present invention.

In one embodiment, initially, media analysis program 130 and media identification function 135 have previously collected and analyzed received viewing data, and stored the results to viewer database 150 and/or generated one or more reports indicating viewing trends and/or viewing habits associated with a user of monitoring device 30.

In step 510, demographic function 140 retrieves viewing patterns and/or trends for a viewer associated with monitoring device 30. In one embodiment, demographic function 140 retrieves viewing patterns and trends associated with monitoring device 30 that have been previously stored to viewer database 150. In another embodiment, demographic function 140 accesses a previously generated report containing viewing patterns and/or trends that are associated with monitoring device 30.

In step 520, demographic function 140 compares retrieved viewing patterns and/or trends to demographic information associated with media consumption. Such demographic information may associate particular groups of people with particular television programs, radio broadcasts, advertisements, media genres, or other media content. In some embodiments, demographic information may associated particular groups of people with viewing habits or trends, such as, for example, hours of media consumed over a time frame, types of media consumed, location of media consumption, user actions taken while consuming media, or other habits or trends. Demographic information associated with media consumption may be obtained from research institutions, advertising agencies, media broadcasters, cable/satellite providers, internet service providers (ISPs), or other enterprises (not shown).

While comparing retrieved viewing patterns and/or trends to demographic information associated with media consumption, demographic function 140 may identify one or more demographic groups that correspond to the viewing patterns and/or trends of a user of monitoring device 30. For example, demographic function 140 may analyze the viewing patterns and/or trends of the user of monitoring device 30 and, for example, identify a particular demographic group (or multiple demographic groups) that appears to have similar viewing patterns and/or trends as a user of monitoring device 30. For example, particular television programs may each be primarily associated with a particular demographic group based on, for example, television ratings information. Upon receiving information indicating a set of television programs frequently viewed by a user, demographic function 140 may identify that there are one or more demographic groups who also frequently view the set of television programs, or a large portion of the set of television program. Based on such information, demographic function 140 may associate the user with the one or more demographic groups.

In step 530, demographic function 140 creates a demographic profile likely associated with a user of monitoring device 30. Demographic function 140 may create a demographic profile based on the identified patterns within the viewing patterns and/or trends that suggest the user of monitoring device 30 is a part of one or more demographic groups. Over time, and based upon additional data received, embodiments of demographic function 140 may refine or update likely demographic associations. In one embodiment, upon determining that a user of monitoring device 30 likely belongs within a particular age group, demographic function 140 may anticipate, recommend to the user of monitoring device 30, or confirm that the user belongs within the particular age group by identifying changes in viewing trends over time. Demographic function 140 may store created demographic profiles to a database, such as viewer database 150. In some embodiments, demographic function 140 may supplement a report generated by media identification function 135 with demographic profile information.

Figure 6:
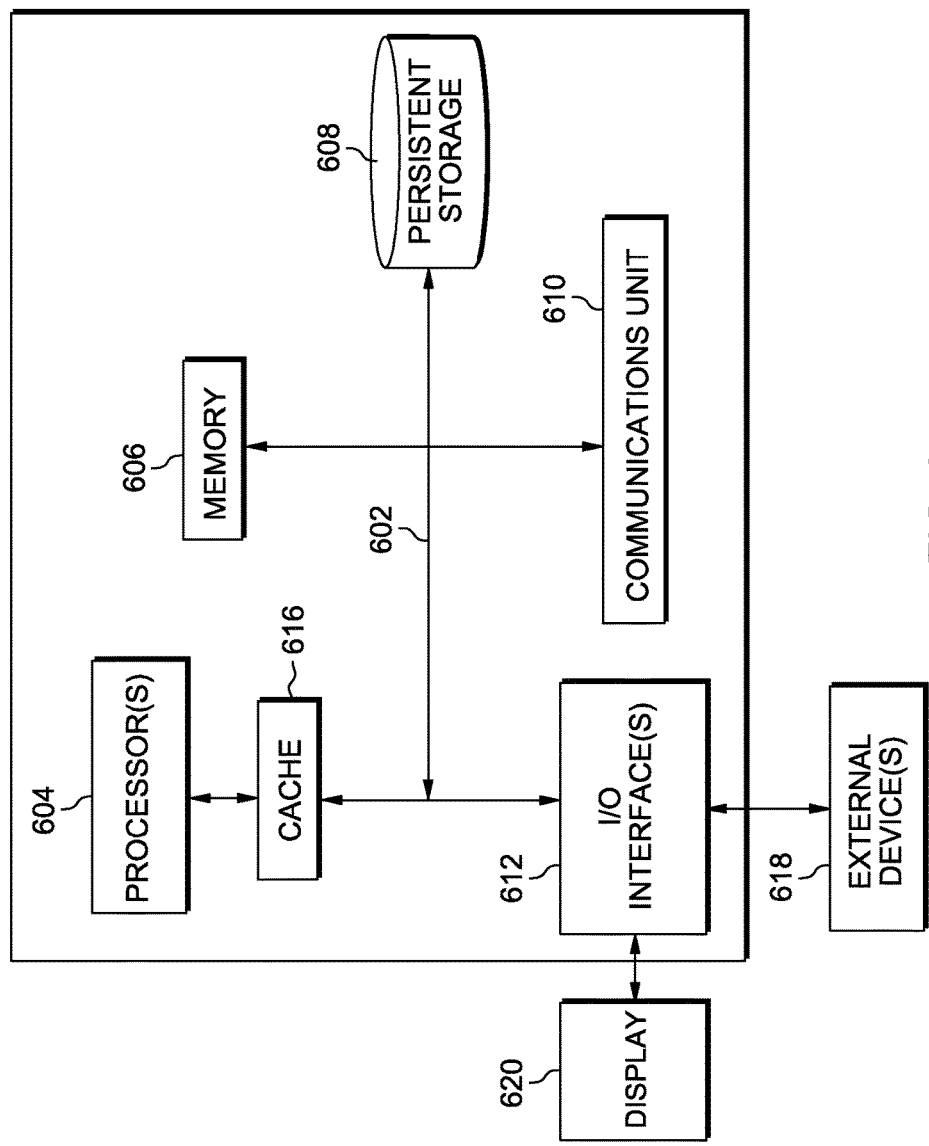
FIG. 6 depicts a block diagram of components of the monitoring device, broadcaster server, and server, in accordance with one embodiment of the present invention.

FIG. 6 depicts a block diagram of components of monitoring device 30, server 50, and broadcaster server 60, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Monitoring device 30, server 50, and broadcaster server 60 each include, respectively, communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Media monitoring program 105, automatic action function 115, media data repository 120, and user preference repository 125 may each be stored in persistent storage 408 of monitoring device 30 and in memory 406 of monitoring device 30 for execution and/or access by one or more of the respective computer processors 404 of monitoring device 30 via cache 416 of monitoring device 30. Media analysis program 130, media identification function 135, demographic function 140, media content database 145, and viewer database 150 may each be stored in persistent storage 408 of server 50 and in memory 406 of server 50 for execution and/or access by one or more of the respective computer processors 404 of server 50 via cache 416 of server 50. Broadcast content 155 may be stored in persistent storage 408 of broadcaster server 60 and in memory 406 of broadcaster server 60 for execution and/or access by one or more of the respective computer processors 404 of broadcaster server 60 via cache 416 of broadcaster server 60. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Media monitoring program 105, automatic action function 115, media data repository 120, and user preference repository 125 may each be downloaded to persistent storage 408 of monitoring device 30 through communications unit 410 of monitoring device 30. Media analysis program 130, media identification function 135, demographic function 140, media content database 145, and viewer database 150 may each be downloaded to persistent storage 408 of server 50 through communications unit 410 of server 50. Broadcast content 155 may be downloaded to persistent storage 408 of broadcaster server 60 through communications unit 410 of broadcaster server 60.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., media monitoring program 105, automatic action function 115, media data repository 120, and user preference repository 125, can be stored on such portable computer readable storage media and can be loaded onto persistent storage 408 of monitoring device 30 via I/O interface(s) 412 of monitoring device 30. Software and data used to practice embodiments of the present invention, e.g., media analysis program 130, media identification function 135, demographic function 140, media content database 145, and viewer database 150, can be stored on such portable computer readable storage media and can be loaded onto persistent storage 408 of server 50 via I/O interface(s) 412 of server 50. Software and data used to practice embodiments of the present invention, e.g., broadcast content 155, can be stored on such portable computer readable storage media and can be loaded onto persistent storage 408 of broadcaster server 60 via I/O interface(s) 412 of broadcaster server 60. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for monitoring media consumption, the method comprising:
    receiving data from a media collection device, wherein the data comprises at least information generated by at least one media broadcasting device of one or more media broadcasts;
    comparing, by one or more processors, the data to previously stored signatures, wherein the previously stored signatures are each associated with a respective media broadcast;
    identifying, by one or more processors, the one or more media broadcasts using the data and the previously stored signatures;
    compiling, by one or more processors, the identified one or more media broadcasts with a set of previously stored media broadcasts associated with the media collection device;
    determining, by one or more processors, media consumption habits to associate with a user of the media collection device, based on at least the identified one or more media broadcasts and the set of previously stored media broadcasts associated with the media collection device;
    identifying, by one or more processors, an action to perform on a first media broadcasting device, based on at least the media consumption habits; and
    automatically causing, by one or more processors, the media collection device to perform the identified action on the first media broadcasting device.

2. The method of claim 1, further comprising:
    identifying, by one or more processors, demographic information to associate with the user of the media collection device, based on at least the determined media consumption habits.

3. The method of claim 1, wherein the media collection device collects data continuously during time periods the media collection device is operational.

4. The method of claim 1, wherein the media collection device is a mobile device.

5. The method of claim 1, wherein the received data further comprises commands issued to the first media broadcasting device.

6. A computer program product for monitoring media consumption, the computer program product comprising:
    one or more computer readable storage media and program instructions stored on the one or more computer readable storage media, the program instructions comprising:
    program instructions to receive data from a media collection device, wherein:
        the data comprises at least information generated by at least one television of one or more media broadcasts; and
        the media collection device includes an infrared (IR) blaster;
    program instructions to compare the data to previously stored signatures, wherein the previously stored signatures are each associated with a respective media broadcast;
    program instructions to identify the one or more media broadcasts using the data and the previously stored signatures;
    program instructions to compile the identified one or more media broadcasts with a set of previously stored media broadcasts associated with the media collection device;
    program instructions to determine media consumption habits to associate with a user of the media collection device, based on at least the identified one or more media broadcasts and the set of previously stored media broadcasts associated with the media collection device;
    program instructions to identify an action to perform on a first television, based on at least the media consumption habits, wherein the action affects an aspect of media presentation by the television; and
    program instructions to automatically cause the media collection device to perform the identified action, utilizing the IR blaster, on the first television.

7. The computer program product of claim 6, further comprising:
    program instructions, stored on the one or more computer readable storage media, to identify demographic information to associate with the user of the media collection device, based on at least the determined media consumption habits.

8. The computer program product of claim 6, wherein the media collection device collects data continuously during time periods the media collection device is operational.

9. The computer program product of claim 6, wherein the media collection device is a mobile device.

10. The computer program product of claim 6, wherein the received data further comprises commands issued to the first television.

11. A computer system for monitoring media consumption, the computer system comprising:
    one or more computer processors, one or more computer readable storage media, and program instructions stored on the computer readable storage media for execution by at least one of the one or more processors, the program instructions comprising:
    program instructions to receive data from a media collection device, wherein:
        the data comprises at least information generated by at least one television of one or more media broadcasts; and
        the media collection device includes an infrared (IR) blaster;
    program instructions to compare the data to previously stored signatures, wherein the previously stored signatures are each associated with a respective media broadcast;
    program instructions to identify the one or more media broadcasts using the data and the previously stored signatures;
    program instructions to compile the identified one or more media broadcasts with a set of previously stored media broadcasts associated with the media collection device;
    program instructions to determine media consumption habits to associate with a user of the media collection device, based on at least the identified one or more media broadcasts and the set of previously stored media broadcasts associated with the media collection device;
    program instructions to identify an action to perform on a first television, based on at least the media consumption habits, wherein the action affects an aspect of media presentation by the television; and
    program instructions to automatically cause the media collection device to perform the identified action, utilizing the IR blaster, on the first television.

12. The computer system of claim 11, further comprising:
program instructions, stored on the one or more computer readable storage media, to identify demographic information to associate with the user of the media collection device, based on at least the determined media consumption habits.

13. The computer system of claim 11, wherein the media collection device collects data continuously during time periods the media collection device is operational.

14. The computer system of claim 11, wherein the media collection device is a mobile device.

15. The method of claim 1, wherein the identified action is selected from the group consisting of: adjusting volume of the media broadcasting device, muting the media broadcasting device, changing a channel of the media broadcasting device, powering on the media broadcasting device, and powering off the media broadcasting device.

16. The method of claim 1, wherein:
the media collection device is a smartphone;
the media collection device includes an infrared (IR) blaster;
the media broadcasting device is a television; and
the step of causing the media collection device to perform the identified action on the first media broadcasting device utilizes the IR blaster to perform the identified action on the first media broadcasting device.

* * * * *